United States Patent Office 2,867,595
Patented Jan. 6, 1959

2,867,595

VULCANIZATION OF RUBBER

Allon Skipsey, Woking, England

No Drawing. Application August 27, 1954
Serial No. 452,725

12 Claims. (Cl. 260—23.7)

This invention relates to the vulcanization of rubber (including sulphur vulcanizable synthetic and reclaimed rubber) by methods which employ one or other of the sulphides of phosphorus as the vulcanizing reagent. This application is a continuation-in-part of my co-pending application Serial No. 275,680, filed March 8, 1952, which in turn is a continuation of my co-pending application Serial No. 76,189, filed February 12, 1949, now abandoned.

It is well known that certain zinc compounds such as zinc oxide, zinc carbonate and zinc stearate, and other organic zinc salts, have an important influence during the hot vulcanization of rubber when organic accelerators are used, and it is also known that when more active accelerators are used which cause the rubber compound to vulcanize at room temperatures or low temperatures such zinc compounds have a useful effect. However, these zinc compounds are without any useful action when used in a rubber compound in association with the sulphides of phosphorus as the vulcanizing reagents, and in fact they tend in most instances to retard vulcanization.

The present invention is intended and adapted to obviate the disadvantages inherent in the prior art, it being among the objects thereof to provide a vulcanizing composition of sulphides of phosphorus containing a substance which will accelerate the vulcanization particularly in the later stages of the operation.

It is also among the objects of the invention to provide a vulcanizing composition of the character described which requires a lesser amount of said sulphides for accomplishing the desired vulcanization.

The present invention comprises the use, in a vulcanizing process employing the sulphides of phosphorus, a aluminum salts of certain organic acids, these compounds being very active in promoting the vulcanizing effect of the sulphides of phosphorus. By way of explanation it may be stated that smoked sheet rubbers, which according to known processes vulcanize more slowly than pale crepe rubbers, and require seven parts of phosphorus sesqui-sulphide paste reagent per hundred parts of smoked sheet, require much less quantities of the phosphorus sesqi-sulphide reagent when the aluminum compounds are used. The following are specific examples of the operation of the invention:

Example 1

If six parts of aluminum stearate is first compounded with the smoked sheet rubber (100 parts) it is possible to get good and complete vulcanization using ony five and one-half parts of the phosphorus sesqui-sulphide paste reagent. The proportion of the aluminum compound employed is between 3 parts and 20 parts (by weight) of compound to each 100 parts (by weight) of rubber.

Example 2

Butadiene-styrene rubber:

| | Parts by weight |
|---|---|
| GR/S | 100 |
| Aluminum stearate | 6 |
| Zinc carbonate | 14 |
| Phosphorus sulphide reagent | 5 |

Add ground cork 125 parts by weight and sheet through the calender to the desired thickness. Then vulcanize at about 80° C.

Example 3

Butadiene acrylonitrile copolymer rubber:

| | Parts by weight |
|---|---|
| Hycar 1011[1] | 100 |
| Plasticizer | 20 |
| Aluminum stearate | 6 |
| China clay | 40 |
| Phosphorus sulphide reagent | 5 |

[1] Hycar 1011 is a low molecular weight polymer of butadiene and acrylonitrile.

Add ground cork 172 parts by weight, sheet through the calender to the desired thickness, and vulcanize.

Example 4

Polychloroprene rubber:

| | Parts by weight |
|---|---|
| Neoprene GN | 100 |
| Light magnesium oxide | 4 |
| Aluminum stearate | 6 |
| Mineral oil | 24 |
| Aromatic distillate | 16 |
| China clay | 60 |
| Phosphorus sulphide reagent | 1 |

Add ground cork 200 parts by weight, calender to sheet, and vulcanize.

The basis of the invention is the discovery that those organic salts of aluminum which are soluble to some extent in the rubber compound to be vulcanized, will facilitate the vulcanization when sulphides of phosphorus are used.

An important advantage of this invention is that the improvement in the vulcanizing effect is noticeable in the latter stages of the process when under known conditions reduction in the available amount of reagent and the gradual saturation of the rubber would normally slow down the reaction, as a consequence the reaction completes itself in one-half to one-third of the time required in the absence of an aluminum compound.

The fatty or other organic acids from which the aluminum compounds are prepared, have, when used in a rubber compound, some retarding effect on the onset of vulcanization, and the aluminum compounds themselves behave in the same way. This is important as it allows time for the manipulation of the rubber compound on the mixing rolls and calender before set up commences.

Suitable aluminum compounds are aluminum stearate, oleate, palmitate, laurate and aluminum resinate, especially the product obtained from resins modified either by heat or hydrogenation. An aluminum salt of shellac (e. g. a salt precipitated from a solution of saponified shellac) is also useful, and the aluminum salts of naphthenic acid, phthalic acid and benzoic acid have also been found to be effective. It is usual to make use of aluminum stearate, aluminum naphthenate or aluminum resinate as these materials are most easily obtained in commercial quantities and they are easily soluble in rubber and the organic acids are already in use for rubber compounding. About six parts by weight to each 100 parts by weight of rubber has been found a useful proportion. The other substances are more often used in small quantities in addition to the stearate, naphthenate or resinate because of their marked softening action during mill processing. The commercial grades of naphthenic acids are variable in their behaviour and it is necessary to choose a grade known to have a behaviour suited to the purpose. Commercially, the salts known as aluminum stearates, oleates etc. may also contain small quantities of other fatty acid salts. The names of the salts as used herein must be taken as including these commercial grades of such salts.

Naphthenic acids are carbocyclic mono-carboxyllic acids having 6 to 10 carbon atoms; the aromatic acids have at least 7 carbon atoms; and the open-chain acids are mono-carboxyllic, aliphatic acids having at least 8 carbon atoms; the resin acids are those occurring in the natural resin colophony, rosin and like acid resins, and are generally considered to be mono-carboxyllic. These types of acids form salts with aluminum which are applicable to the present invention.

An important application of the aluminum compounds has been observed in the preparation of the vulcanizing reagents described in Patents Nos. 1,653,821 and 1,979,499. The first patent discloses a rubber solution in a volatile organic liquid, such as carbon disulphide with phosphorus sulphides ($P_4S_3$ and $P_4S_{10}$) as vulcanizing agents. The latter patent describes the addition to rubber of a paste containing phosphorus sulphide, sulphur, a base such as MgO, CaO or an organic base, with or without an oil such as mineral, sperm, rosin or certain other oils as a vehicle, and with or without heating.

For the present purpose aluminum stearate or aluminum naphthenate are preferred to other aluminum compounds because of their solubility in the oil vehicle. It has been found that when a proportion of the oil vehicle is replaced by the addition of an aluminum compound, which is dissolved in the oil by means of heating, a gel is obtained which not only provides a better medium for the suspension of the ingredients used in the reagent, but results also in the reagent itself being more effective in its behaviour in rubber compounds. It has been pointed out in Patent No. 1,979,499 that a heat treatment produces a change in the reagent which make it more effective as a vulcanizing agent. This improvement is also obtained in the presence of aluminum stearate or naphthenate and the change takes place at a lower temperature, before the mixture melts, thus the process of regrinding mentioned in Patent No. 1,979,499 is not necessary. In works' practice, the heat of the rubber compound on the rolls is sufficient to bring about the change in the reagent and an improved vulcanization is obtained using a reagent mixture not previously heated. However, it is preferred to bring about the change by some method more susceptible to control, in order to be sure of a uniform product.

Improvements observed when the aluminum compound is added to a rubber mix during compounding on the rolls are characterized by a definite increase in the rate of set-up of the rubber compound, after the addition of the phosphorus reagent, and the increase is more noticeable during the later stages, when under known conditions the rate of set-up might be expected to slow down, owing to the decrease in the proportion of available reagent, and to the gradual saturation of the rubber. It is noteworthy that increasing the proportion of vulcanizing reagent, in the absence of an aluminum compound, does not increase the rate of set-up (vulcanization) to any marked degree. It is doubtful whether a rubber compound containing the requisite proportion of phosphorus sulphide or one or other of the reagents containing a sulphide of phosphorus to enable the rubber to reach the ebonite stage, would ever vulcanize to the ebonite stage if kept at room temperatures. At temperatures over 100° C., an ebonite is formed, the reaction being violent compared with a normal heat vulcanized ebonite compounded of rubber sulphur and organic accelerator.

The use of the reagent described in Patent No. 1,979,499 modified in that part of the vehicle is replaced by an aluminum compound, preferably aluminum stearate or aluminum naphthenate, shows a definite advantage compared with the reagents as originally suggested in that patent. Physically, the mixture according to the present invention gives a smoother paste, more easily incorporated into the rubber compound during the mixing operation on the rolls. At the same time the improvement in the reagent due to heating as set out in Patent No. 1,979,499 takes place at a much lower temperature and can be effected below the melting point of the mixture. By this means the regrinding of the mixture after heating is no longer necessary. In the presence of the aluminum salts, the sulphides of phosphorus react preferentially with rubber at temperates up to 90° C. and in some cases, up to 100° C. Once vulcanization has commenced higher temperatures may be used but such temperatures are not necessary. There is no tendency to overvulcanize the product.

Aluminum salts of other organic acids are also suitable provided they are soluble in the rubber composition. Among them are the acids naturally occurring in animal and vegetable glyceride oils, and having numbers of carbon atoms from about 10 to 22, synthetic organic acids such as the straight and branched chain acids produced by the oxidation of hydrocarbon oils, aromatic acids which are mono- or polynuclear and may have alkyl groups on the rings, and hydrogenated natural or synthetic resin acids. In all cases the nucleus of the aluminum salt should contain no groups which will react with the sulphides of phosphorus at room temperatures and higher, and it should be measurably soluble in the rubber composition. In the claims the term "rubber" is intended to include both natural and synthetic rubbers.

I claim:

1. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum salt of a hydrocarbon carboxylic acid selected from the group consisting of aromatic acids having at least 7 carbon atoms, open chain aliphatic acids having at least 8 carbon atoms, and cycloaliphatic acids having at least 6 carbon atoms, said salt being soluble in said composition.

2. The method of claim 1, in which the composition contains mineral oil in which said salt is soluble.

3. The method of claim 1, in which the composition contains mineral oil in which said salt is soluble, said oil and salt forming a gel.

4. The method of claim 1, in which the composition contains 3 to 20 parts of said aluminum salt to 100 parts of rubber.

5. In a process for the vulcanization of sulphur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum salt of naphthenic acid, said salt being soluble in said composition.

6. In a process for the vulcanization of sulphur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum salt of shellac, said salt being soluble in said composition.

7. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum salt of rosin, said salt being soluble in said composition.

8. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of aluminum stearate, said salt being soluble in said composition.

9. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum oleate, said salt being soluble in said composition.

10. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum palmitate, said salt being soluble in said composition.

11. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum laurate, said salt being soluble in said composition.

12. In a process for the vulcanization of sulfur vulcanizable rubbers which comprises vulcanizing an unvulcanized composition containing such a rubber with a sulphide of phosphorus capable of vulcanizing the rubber, the improvement which comprises vulcanizing such a composition after the addition of an aluminum salt of an organic carboxylic acid, said salt being soluble in said composition, said acid having 12 to 22 carbon atoms.

No references cited.